UNITED STATES PATENT OFFICE.

LEVI L. HILL, OF NEW YORK, N. Y., ASSIGNOR TO SIMON STEVENS, OF NEW YORK.

IMPROVED MODE OF BURNING PETROLEUM AND OTHER HYDROCARBONS.

Specification forming part of Letters Patent No. 38,137, dated April 7, 1863; Reissue No. 1,785, dated October 4, 1864.

*To all whom it may concern:*

Be it known that I, LEVI L. HILL, of the city, county, and State of New York, have invented a new and useful Mode of Burning Petroleum and Similar Hydrocarbon Liquids for the Production of Light and Heat, of which the following is a specification.

The nature of my invention consists in converting petroleum or other hydrocarbon liquid into vapor by the application of heat, mixing such vapor with common atmospheric air, or with air and steam, and burning this mixture of vapor and air, or vapor, air, and steam, for the purpose of producing heat and light.

To enable others skilled in the art to make and use my invention, I give the following full, clear, and exact description thereof.

On the 20th of December, 1859, Patent No. 26,497 was granted to me, in which I describe a process of mixing the vapor of a hydrocarbon fluid with atmospheric air for the production of light or heat or both. Since making application for that patent I have made additional improvements in the mode of burning hydrocarbon liquids, whereby I am enabled to make said process one of general application for burning any volatile or vaporizable hydrocarbon liquid for the production of light and heat. I have also discovered that by a proper application of the vapor of water or steam to the mixture of hydrocarbon vapor and air the heating-power of the combination is greatly increased, and that by regulating the ignited jet of a mixture of hydrocarbon vapor and air with or without steam, and inclosing it in a hollow case of platinum finely perforated, or made of fine wire or sponge of that metal, an intense light can be produced, exceeding greatly that which the mixture would produce if ignited in open space, and at a very small consumption of the materials.

For blowing a steady stream of air I use the apparatus described in the patent above mentioned or any other equivalent machine or apparatus. With this I use a vaporizing-vessel of such construction that it can be readily heated and so that the heat may be regulated, as may be required, either on account of the amount of vapor to be furnished or the degree of heat necessary to vaporize different liquids. Into the vaporizing-vessel is placed the hydrocarbon liquid and heat is applied, so as to convert into vapor, which vapor is then mixed with a stream of atmospheric air from the blowing apparatus, or with air and steam, or air may be blown through the liquid while it is being vaporized, so that it will intimately mingle with the vapor. The mixture thus produced is burned by suitable jet or other burners. Another mode which I use in carrying out this invention is to mix water with the hydrocarbon fluid in the vaporizing-vessel and apply heat to the vessel, thus causing some of the watery vapor to pass off with the vapors of the hydrocarbon fluid. Any form of vaporizing-vessel may be used, and it may be fixed at any convenient place. When the heat is desired for generating steam, I find that better results are obtained by using a stronger flow of steam than can be obtained from these vaporizing-vessels, and I therefore prefer using live steam from a steam-boiler or other source.

Under some circumstances it may be advisable to pass the steam through or over the hydrocarbon fluid and afterward mix therewith atmospheric air. This is particularly the case when the hydrocarbon fluid has a range of volatility requiring a high temperature for the production of its vapor. In this modification the water in the vaporizing-vessel and the lamp or other mode of heating the vaporizing-vessel may be dispensed with. The combustion of these combined vapors and air produces an intense heat, which may be utilized by proper appliances for generating steam, fusing metals, or any other of the practical arts requiring such temperatures. For producing light from the combustion of these vapors and air acting on platinum, I use any form of burner—such, for instance, as is commonly used in burning ordinary gas—and place upon it, so as to inclose its orifice, a hollow closed chimney or cap of a spherical, oval, or other form, made of thin platinum plates perforated with minute holes over its whole surface, or construct a cap or chimney of the same form of fine platinum wire, or, what would perhaps act as well, of platinum sponge. When the mixed vapors and air are first turned into the cap or chimney and lighted, if in too large a volume, a flame is found enveloping the cap to a greater or less extent by the issue of the mixed materials through the orifices or interstices of the cap; but by a careful manipulation of the stop-cocks in the pipes the flame should be reduced and brought within the cavity of the cap or chimney, when the platinum immediately assumes a bright white heat, emitting a brilliant light, rivaling almost in brilliancy the famous calcium light, thus producing at small cost a steady mild light much superior to ordinary gas. This light may be easily adapted for use in light-houses.

I do not claim as my invention the combustion of petroleum or liquid hydrocarbons for producing heat and light, since I am aware that it has been proposed to burn such liquids in various modes for generating steam and for heating; but these modes have not proved satisfactory, since where fire is brought in direct contact with liquid petroleum it is exceedingly difficult to prevent smoke, and also difficult to regulate the combustion. I am also aware that a jet of petroleum-vapor has been burned by causing it to mingle with the open air under a grating; nor do I claim subjecting hydrocarbon liquids either alone or mixed with steam to a high temperature, so as to produce a permanent gas, and then mixing such gas with air; nor do I claim what has long been known as the "benzole light," which consists in charging fibrous, spongy, and porous materials with the light liquid known as "benzine," and then driving air through such materials, so as to saturate it with hydrocarbon vapor. I am also aware that platinum has heretofore been used with the vapors of hydrocarbon, but not in the manner I propose.

By the application of my invention I am able to use as fuel any of the liquids derived from petroleum or the crude petroleum itself. The combustion is always completely under the control of the person using it, and by regulating the relative quantity of air and hydrocarbon vapor, or of air, vapor, and steam, the flame can always be kept free from smoke and its intensity controlled, which renders my invention exceedingly useful for generating steam—as in steam-engines, locomotives, &c.—and also for ordinary heating and warming, and for producing artificial light.

Having thus described my invention and the several modes in which I contemplate its application, what I claim, and desire to secure by Letters Patent of the United States, is—

1. The mode or process herein described for burning petroleum and similar hydrocarbon liquids for the production of heat or light, or of heat and light.

2. Combining or mixing steam of the vapor of water with hydrocarbon vapor and air, substantially as set forth, for producing by combustion an intensely-heated flame for generating steam, and for metallurgic and other similar purposes.

3. The use of a platinum cap or chimney, constructed and operating as described, in combination with a jet of the mixed vapors of a hydrocarbon and air with or without steam for the production of light, as set forth.

LEVI L. HILL.

Witnesses:

ROBT. D. MCEWEN,

E. R. MEADE.